Feb. 22, 1944.  H. H. THIEMAN  2,342,618
WAGON
Filed June 23, 1941
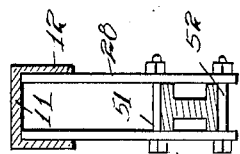
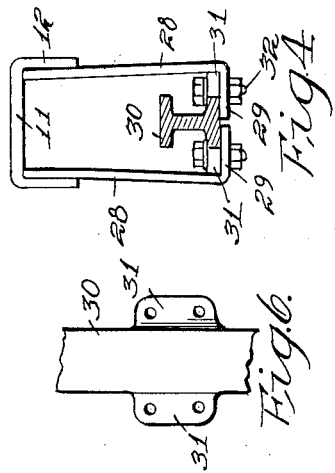
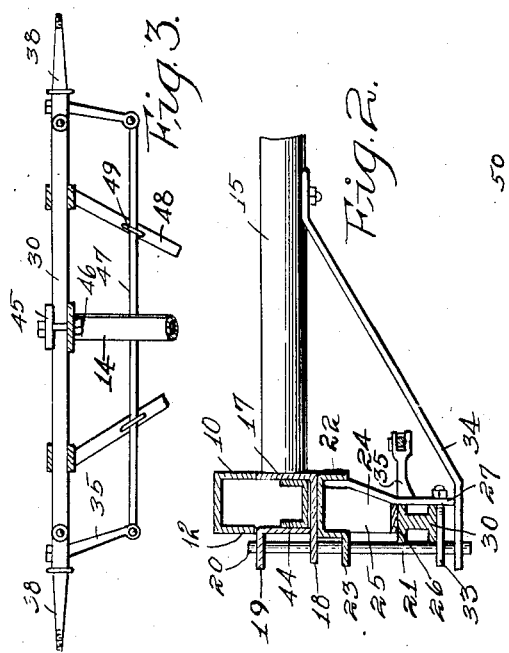
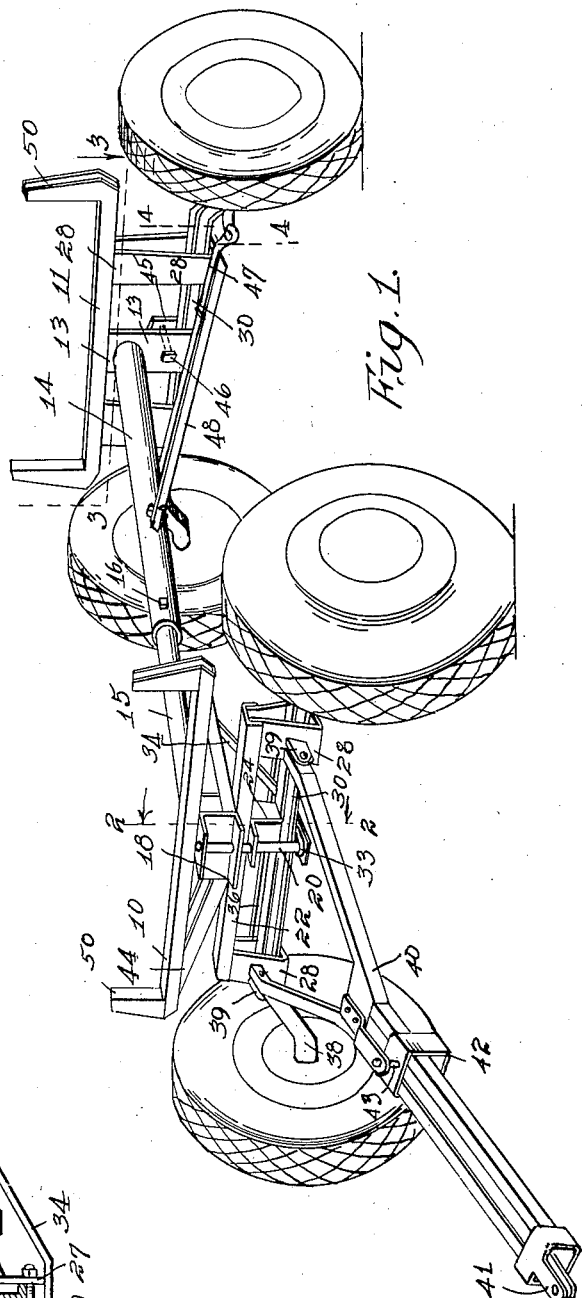
Inventor
Herman H. Thieman Patented Feb. 22, 1944

2,342,618

UNITED STATES PATENT OFFICE 2,342,618

WAGON

Herman H. Thieman, Albert City, Iowa, assignor to The Thieman Harvester Company, Albert City, Iowa, a corporation of Iowa Application June 23, 1941, Serial No. 399,296

6 Claims. (Cl. 280—80)

The object of my invention is to provide a simple and durable wagon construction, formed preferably of fabricated structural steel having means provided wherein discarded front axles and wheels of certain types of automobiles may be utilized as axles and wheels instead of the ordinary types, to cheapen the initial cost of the wagon and at the same time provide a wagon that may be operated on the highways at high speeds as a trailer or that may be used on the farm in the usual manner.

A further object is to provide in a wagon structure of the type above described, a stub tongue whereby the wagon may be utilized as a trailer, said tongue including means to permit a standard tongue to be easily and quickly attached thereto so that the wagon may be drawn by horses in the usual manner.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of my improved wagon with the box removed;

Figure 2 is a detail sectional view taken on the line 2—2 of Figure 1;

Figure 3 is a detail sectional view taken on the line 3—3 of Figure 1;

Figure 4 is an enlarged detail sectional view taken on the line 4—4 of Figure 1, showing the manner in which one type of an automobile axle is secured to the wagon;

Figure 5 illustrates the manner in which another type of axle is secured to the wagon; and Figure 6 is a detail top view of a portion of the axle illustrating the spring saddle.

My improved wagon comprises a front bolster 10 and a rear bolster 11, said bolsters being formed preferably of channel iron having downwardly extending flanges 12, the bolster 11 having a downwardly extending plate 13 at its central portion to which the back end of a tubular reach 14 is welded, the forward end of the reach 14 being adapted to telescopically receive a reach portion 15 which is adjustably mounted therein by means of a set screw 16, the forward end of the member 15 being welded to a plate 17 forming a part of the bolster 10, said plate 17 being mounted beneath the central portion of said bolster and fixed thereto, and having a forwardly extending plate 18.

Supported beneath the front flange of the bolster 10 is an angle plate 19 which is also secured to said flange and to the plate 18, the said members 18 and 19 being provided with a vertically arranged pin 20 having a downwardly extending portion 21. The plate 18 is pivotally supported on top of an inverted channel iron 22 forming a portion of what I shall term an axle support, the front flange of said member 22 having a forwardly extended plate 23 which supports the pin 20, the central portion of the member 22 being provided with a bracket 24 comprising end members 25, a bottom member 26 and a back plate 27, the lower end of the plate 27 extending downwardly from the member 26. Each end of the channel 22 is provided with downwardly extending members 28 having their lower ends bent inwardly at 29 to form stirrups for supporting an axle 30 of that type employed as a front axle of an automobile and having spring supporting saddles 31, said saddles resting on the members 29 and fixed in position thereon by means of bolts 32. This same saddle construction is also applied to the rear bolster 11, the front axle 30 being mounted at its central portion, between the pin 20 and the member 27. A U bolt 33 is mounted in the plate 27 for clamping the said plate and said pin to said axle.

A brace bar 34 has one end fixed to the reach member 15 and the other pivotally supported on the lower end of the pin 20. The steering arms 35 of the axle 30 are connected to the drag link or tie-rod 36 in the usual manner, with each steering arm or spindle 35 being fixedly retained in longitudinal alignment with the axle 30 by welding or like suitable means. The axle 30 and the supporting member 22 are pivotally mounted beneath the plate 18 in a manner similar to the ordinary wagon construction.

The forward edges of the front plates 28 are provided with forwardly extending lugs 39, to which a stub tongue 40 is pivotally connected, the forward end of the said tongue being provided with straps 41 by means of which it may be connected to the draw bar of a tractor, the tongue being provided with loops 42 of such size as to receive a wooden tongue such as used on the ordinary wagon, which is secured in position therein by means of a pin 43 adapted to fasten in the double tree of said tongue.

The channel bar 10 is provided with braces 44 for rigidly supporting it on the plate 18.

The lower end of the plate 13 is clamped to the central portion of the back axle 30 by means of a plate 45 and bolts 46, the drag link 47 of the rear axle being fixed to brace bars 48 by means of U bolts 49, the forward end of said brace bars being fixed to the tubular member 14 while the rear ends of said bars are fixed to the lower ends of the plates 28, thereby providing means for rigidly supporting the rear axle in position and for rigidly holding it in position transversely of the reach 14. The ends of the members 10 and 11 are provided with the usual upright standards 50.

In Figure 5 I have illustrated a modified means for fixing that type of axle in which no spring saddles are employed, in which case the members 28 are provided with bolts 51 and 52 above and below the axle clamping the said plates 28 against the axle to hold it in position by friction.

Thus it will be seen I have provided a wagon structure which may be formed of fabricated structural steel and in which front axles of discarded automobiles which are still in reasonably good shape may be employed as axles, together with the wheels and the pneumatic tires carried thereby, the front and rear bolsters, together with the reach and the axle-supporting members and the stub tongue being sold to the farmer who then provides the axle and wheels which may be easily and quickly attached by the use of an ordinary wrench. The telescopic reach is adjustable so as to accommodate the boxes or racks of various lengths.

I claim as my invention:

1. In a wagon gear having an axle the adjacent sides of which lie in planes normal to each other, a transversely extended frame member, means for supporting said axle from said frame member including a plurality of pairs of depending portions carried on said frame member, with a depending portion in each of said pairs being arranged opposite a corresponding depending portion in a spaced relation laterally of said frame member to provide for said axle being received therebetween, a portion carried on said depending portions laterally of said frame member and engageable with the bottom side of said axle to support said axle, and means for rigidly clamping said axle with said depending portions.

2. In a wagon gear having an axle with a central portion of a shape such that adjacent sides of said central portion are normal to each other, and a pivoted spindle portion at each end of said central portion normally pivotally movable in a plane into and out of longitudinal alignment with said central portion, frame means including a frame member spaced above said axle central portion but substantially parallel with said central portion, means for supporting said axle from said frame member including a plurality of pairs of downwardly extended portions carried on said frame member, with each portion in a pair of said portions being spaced from a corresponding portion in a direction laterally of said frame member to provide for said axle being received therebetween, a portion carried on said depending portions and projected therebetween constituting a support for the bottom side of the central portion of said axle, means for rigidly clamping said central portion with said depending portions, and means connecting said end spindles with said frame means in a fixed position in substantial longitudinal alignment with said axle central portion.

3. In a wagon gear, a transversely arranged supporting bar having a plurality of pairs of downwardly extending plates spaced apart, the lower end of each plate being bent inwardly to form a support, an axle extended between each pair of plates, said axle having adjacent sides thereof normal to each other, with the bottom side of said axle resting on said supports, and bolts for clamping said axle with said supports.

4. In a wagon gear including an axle of substantially I-shape in cross section, a transversely extended frame member comprised of an inverted channel beam, means for supporting said axle from said frame member including a plurality of depending plates on each leg of said frame member, with the depending plates on one leg being spaced opposite corresponding depending plates on the other leg of said frame member, with each plate having a lower end portion projected inwardly toward a corresponding plate, with said lower ends constituting a support for the bottom side of said axle, and clamp means extended through each of said lower ends and having a portion engageable with the top of the lower horizontal part of said I-shaped axle to clamp said axle on said lower ends.

5. In a wagon gear, a transversely arranged supporting bar having a plurality of pairs of downwardly projecting and spaced plates, an axle with adjacent sides thereof normal to each other and extended between said pairs of plates, and means for supporting said axle on said plates comprising bolts extending through corresponding pairs of plates adjacent the top and bottom sides of said axle for supporting said axle and clamping said plates against the axle.

6. In a wagon gear including an axle of substantially I-shape in cross section, a transversely extended frame member comprised of an inverted channel beam, means for supporting said axle from said frame member including a plurality of flat plate portions depending from the channel legs of said frame member, with a plate portion on one of said legs being spaced opposite a plate portion on the other of said legs to provide for said axle being received between each corresponding pair of said plate portions, and means for clamping said axle with said plate portions including bolts extended through each of said pairs of plate portions and in a supporting position relative to the bottom side of said axle.

HERMAN H. THIEMAN.